(12) United States Patent
Millman

(10) Patent No.: US 7,970,087 B2
(45) Date of Patent: Jun. 28, 2011

(54) EYE CENTER DETERMINATION SYSTEM AND METHOD

(75) Inventor: Steven D. Millman, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1737 days.

(21) Appl. No.: 11/100,887

(22) Filed: Apr. 6, 2005

(65) Prior Publication Data

US 2006/0227915 A1    Oct. 12, 2006

(51) Int. Cl.
H04L 7/00 (2006.01)

(52) U.S. Cl. ........ 375/355; 375/346; 375/354; 375/359; 375/360; 375/371; 370/392; 370/442; 370/503

(58) Field of Classification Search .................. 375/136, 375/147, 149, 316, 354–355, 357, 360, 363–365, 375/229, 16, 350, 371, 306, 359, 346, 375, 375/299, 146, 259, 295; 370/392, 503, 508, 370/509
See application file for complete search history.

(56) References Cited

U.S. PATENT DOCUMENTS

| | | | | |
|---|---|---|---|---|
| 6,031,847 A * | 2/2000 | Collins et al. | | 370/508 |
| 6,032,284 A * | 2/2000 | Bliss | | 714/792 |
| 6,611,219 B1 * | 8/2003 | Lee et al. | | 341/141 |
| 7,362,795 B1 * | 4/2008 | Lennen | | 375/149 |
| 7,409,031 B1 * | 8/2008 | Lee et al. | | 375/376 |
| 7,418,068 B2 * | 8/2008 | Barrett et al. | | 375/355 |
| 7,532,645 B1 * | 5/2009 | Bataineh et al. | | 370/503 |
| 7,848,470 B2 * | 12/2010 | Hidaka | | 375/350 |
| 2004/0090962 A1 * | 5/2004 | Forest et al. | | 370/392 |
| 2005/0001662 A1 * | 1/2005 | Kizer et al. | | 327/156 |
| 2006/0039513 A1 * | 2/2006 | Sheen et al. | | 375/355 |
| 2006/0227912 A1 * | 10/2006 | Leibowitz et al. | | 375/350 |
| 2008/0049822 A1 * | 2/2008 | Zerbe et al. | | 375/229 |
| 2009/0006730 A1 * | 1/2009 | Gara et al. | | 711/105 |

OTHER PUBLICATIONS

Chih-Kong Ken Yang (IEEE International Solid-State Circuits Conference 1996; pp. 200-201).*

* cited by examiner

*Primary Examiner* — Shuwang Liu
*Assistant Examiner* — Hirdepal Singh
(74) *Attorney, Agent, or Firm* — Ingrassia Fisher & Lorenz, P.C.

(57) ABSTRACT

A system and method for bit eye center determination is provided. In general, the system samples an incoming data stream to determine where transitions in the data stream occur, selectively offsets the selected samples based on state criteria and the number of transitions in each set of samples, accumulates the offset samples and averages the result to determine the center of the bit eye. The system and method also provides the ability to locate the eye center even in the case of noise in the system, whether the noise is random or deterministic, including odd/even noise.

20 Claims, 10 Drawing Sheets

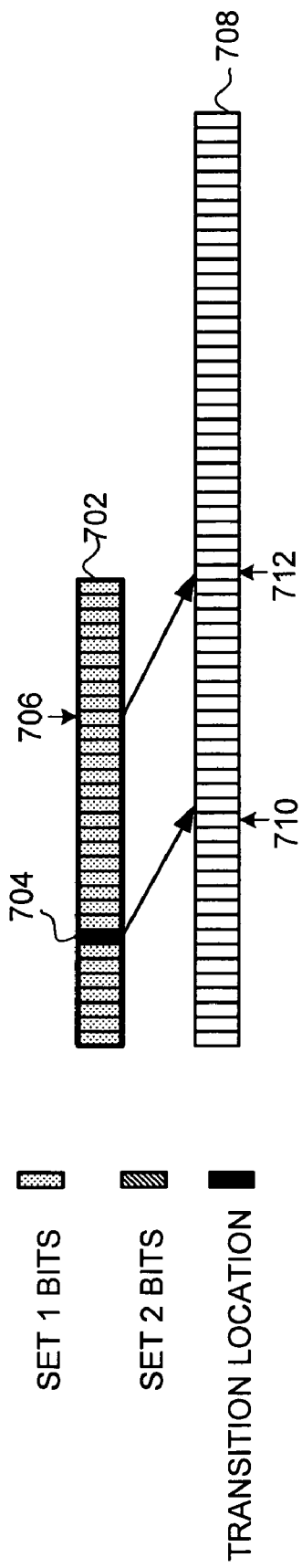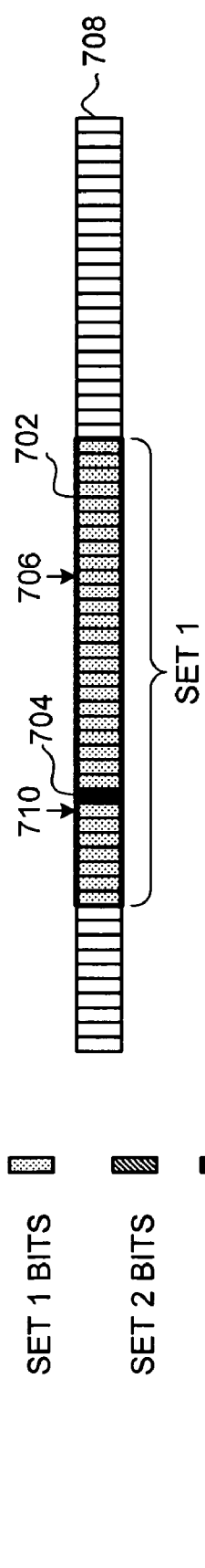

EYE CENTER DETERMINATION SYSTEM AND METHOD

FIELD OF THE INVENTION

This invention generally relates to communication, and more specifically relates to eye center determination in communication systems.

BACKGROUND OF THE INVENTION

Communication systems are becoming increasingly important in all aspects of business and personal life. Modern communication systems transmit data at very high rates of speed. The data is typically transmitted as a series of bits represented by high or low voltage levels in a signal, commonly called a bit stream. In these systems the receiver must be able to accurately and reliably decode the bit stream to extract the transmitted data.

One difficulty in extracting transmitted data from a bit stream is determining where each bit resides in the stream. The location of each bit in the bit stream needs to be identified to determine where the receiver should sample the data stream to accurately extract the data. Otherwise the receiver could miss data bits, sample the same data bit twice, misinterpret a data bit, or otherwise corrupt the received data.

This task is made more difficult and critical by the presence of noise in the communication system which can distort the shape of the data stream. Furthermore, the bit stream can commonly include consecutive bits that are either all high or all low, with no transitions between consecutive bits. Even where transitions between bits exist it can be difficult to quickly and accurately determine where the center of each bit resides. The problem of locating bits in a bit stream is commonly referred to as finding the "eye center" of bits in a data stream.

This problem is particularly acute in burst mode communication devices, where individual clients are assigned specific time slices in which they broadcast short bursts of data. In these systems the receiver must be able to accurately determine the location of bits for each burst of data. Typically there are only a few bits of preamble available in each burst upon which this determination can be made, before actual data bits that must be sampled begin to arrive.

BRIEF DESCRIPTION OF DRAWINGS

The preferred exemplary embodiment of the present invention will hereinafter be described in conjunction with the appended drawings, where like designations denote like elements, and:

FIGS. 10-13 are schematic views of a transition bit sets and a register in accordance with an embodiment of the invention.

DETAILED DESCRIPTION OF THE INVENTION

The present invention provides a system and method for bit eye center determination. In general, the system samples an incoming data stream to determine where transitions in the data stream occur, selectively offsets the selected samples based on state criteria and the number of transitions in each set of samples, accumulates the offset samples and averages the result to determine the center of the bit eye.

Figure 1:
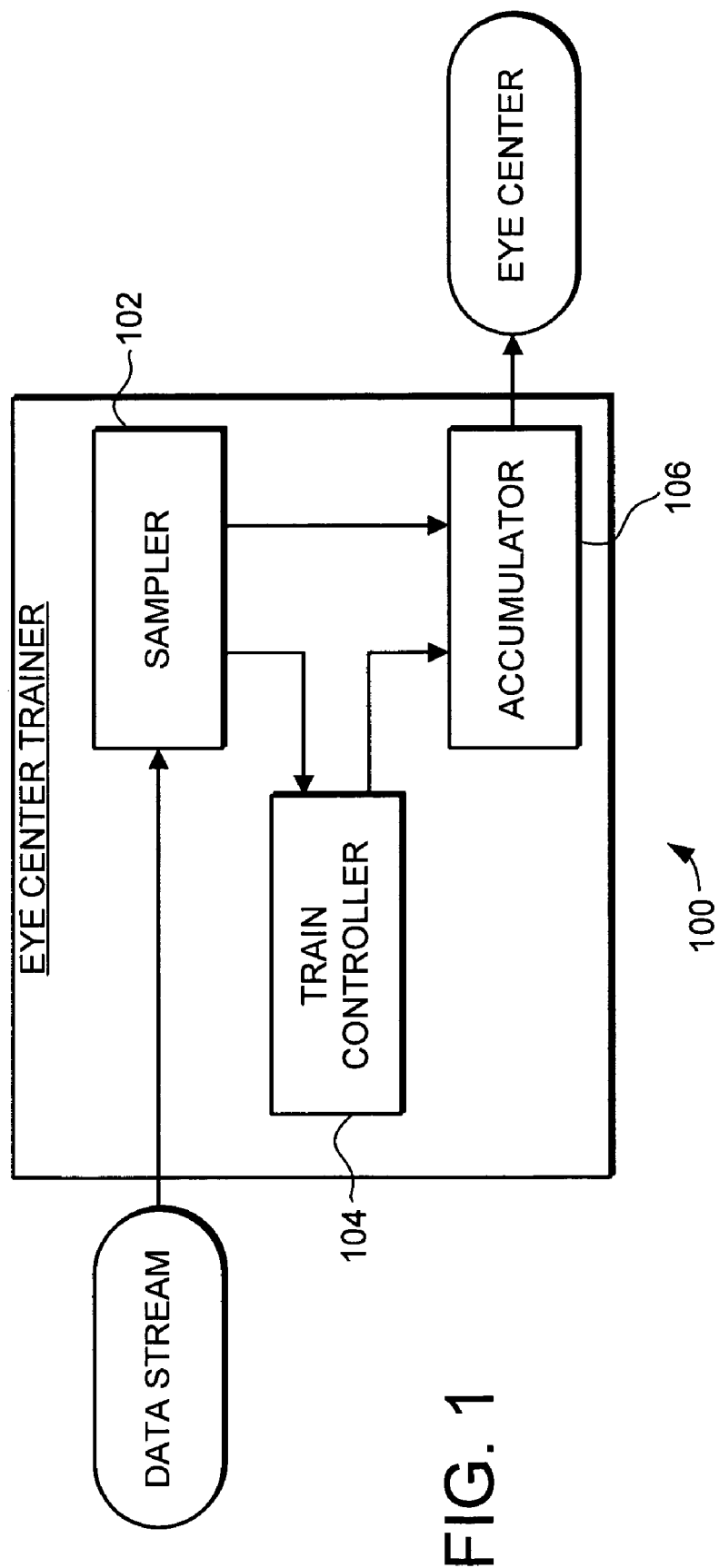
FIG. 1 is a schematic view of an eye center trainer in accordance with an embodiment of the invention.

Turning now to FIG. 1, an eye center trainer 100 is illustrated schematically. The eye center trainer 100 includes a sampler 102, a controller 104 and an accumulator 106. In general, the eye center trainer 100 receives a data stream and determines the eye center of bits in the data stream. Specifically, the data stream is received by the sampler 102. The sampler 102 samples the incoming data stream and passes the samples to the train controller 104. The train controller 104 then locates the transitions by identifying the tap numbers for samples between which the transitions occur, and offsets the tap numbers corresponding to the transitions based on state criteria and the number of transitions in a bit time of the data stream. The criteria and offsets used by the train controller 104 are selected to facilitate accumulation of the offset tap numbers in the accumulator 106 such that the tap numbers can be easily averaged to locate eye center of the bits. As one example, the criteria and offsets are selected such that higher order bits in the accumulated tap numbers provide the average used to locate eye center of the bits. Thus, the eye center trainer 100 is able to quickly and accurately determine the location of the eye center for bits in a data stream.

The eye center trainer 100 provides the ability to locate the eye center even in the case of noise in the system, whether the noise is random or deterministic. One common type of deterministic noise is odd/even noise. Odd/even noise occurs when a component of a system reacts differently to 0 to 1 transitions than it reacts to 1 to 0 transitions. For example, when a 0 to 1 transition takes 1.0 ns while a 1 to 0 transition takes 0.5 ns, 0 bits will appear much wider than 1 bits even though they are supposed to have the same duration. Odd/even noise is common to many types of systems. The result of odd/even noise in the data stream is that some transitions appear early while the opposite transitions appear late. This results in some bits that are shortened while other bits are lengthened. Odd/even noise can be caused by a variety of factors, such as limitations in the amplifiers used to drive the data stream. Specifically, because of responsiveness constraints in the amplifier, the upper and or lower portions of the data stream are clipped in a way which effectively offsets the data stream waveform, shortening some bits and lengthening others. This distortion of the data stream wave pattern makes accurate determination of the eye center extremely difficult using traditional techniques. As will be described in greater detail below, the trainer 100 averages the locations of the consecutive detected transitions and uses the averages to determine the eye center of the bits. Because the trainer 100 averages the locations of the transitions the effects of odd/even noise are negated.

Specifically, the trainer 100 examines the same number of rising edges and falling edges, and one set of edges (rising or falling) will be earlier than expected by some amount, and that the other set of edges (falling or rising) will be later than expected by the same amount. When the located tap numbers for rising and falling edges are averaged, a constant amount is effectively subtracted from half the numbers and the same amount is added to the remaining half. Thus, the resulting average is not affected by the odd/even noise and the trainer 100 is able to accurately determine the eye center of bits in the data stream.

Figure 2:
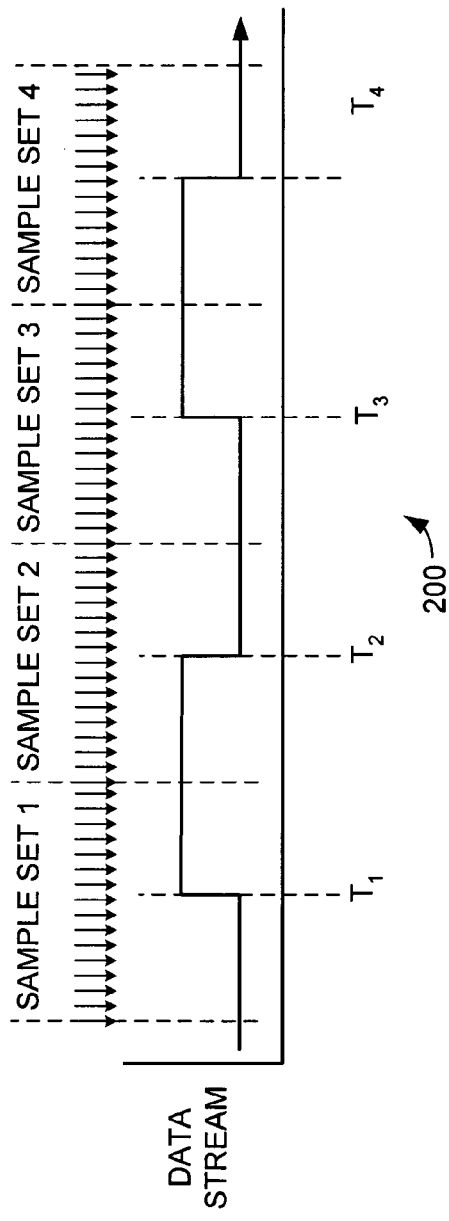
FIGS. 2-5 are schematic views of data streams in accordance with an embodiment of the invention.

Turning now to FIG. 2, an exemplary incoming data stream is illustrated in graph 200. The graph 200 illustrates an exemplary data stream that would typically be included as part of a preamble used for training. Specifically, the preamble provides a set of bits used to determine the center of the bit eye such that the later data bits in the data stream can be reliably decoded.

The data stream is sampled by sampler 102 to locate the transitions in the data stream. The location of those transitions is then used to determine the eye center of these and future bits in the data stream.

The data stream samples are grouped in sets of samples. As will be described in greater detail below, the sets of samples are grouped together to facilitate analysis by the train controller 104. In the example illustrated in FIG. 2, each sample set corresponds to the bit time of the data stream. It should be noted that this is just one example, and in some cases, typically depending on the frequency of the data stream, each sample set may include more or less of the data stream. In the illustrated example, each sample set includes 16 separate samples. Again, this is just one example, and in some cases more or less samples will be used. In one specific example that will be discussed below the number of samples used in each sample set will vary according to the data stream frequency.

The samples provided by the sampler 102 are identified by tap number, where a tap comprises the channel through which the sample of the bit stream is conveyed from the sampler. Each tap provides samples at different times in the data stream. The tap number identifies which tap, and thus, where in time a particular sample was taken.

Typically, the sampler uses a clock to determine when to sample the bit stream. The rate of the sampler clock and the number of samples taken during each sampler clock period determine the number of samples taken of the data stream. In this application, the sampler 102 will be described as producing N samples per sampler clock period. It should be noted that the sampler clock period could be the same as the data stream period, or it could be different. It should also be understood that the sampler clock period may not correspond to an actual clock period, and could instead comprise multiple actual clock periods or a portion of the actual clock period. Furthermore, as will be described in greater detail below, all or a portion of the N samples per sampler clock period can be used to locate the eye center.

In this application T is the "width" of a data bit on the data stream as measured by the number of taps which sample each bit in the data stream. T is thus determined by the rate of sampling and the rate of the incoming data stream. Again, the rate of sampling would typically be dependent upon a clock rate of the sampler used to take the samples. For example, a typical sampler may be able to take 32 samples per sampler clock cycle. Thus, if a sampler can take 32 samples per sampler clock period and there are four sampler clock periods per data bit, T would be equal to 128. Likewise, if there is only one sampler clock period per data bit, T would be equal to 32. If there were two data bits for each sampler clock period then T would equal 16. Finally, if there were four data bits for each sampler clock period then T would equal 8.

Depending on the time between taps and the number of taps per bit T, some portion of the N taps can be used during each sampler clock period. In one embodiment, in order to simplify device logic the same number of samples is used per bit for several different incoming data stream rates.

As one specific example, assume a system with a sampler clock rate of 622 MHz and 32 taps per sampler clock period. In this system the samples can be selected to use 16 samples for 155 MHz, 622 MHz, and 1.2 GHz, while 8 samples are used for 2.4 GHz. Specifically, for an incoming data rate of 155 MHz only 4 of 32 taps are used per sampler clock cycle. Because there are four 622 MHz sampler clock cycles for each 155 MHz data cycle, a total of 16 samples out of 128 are thus used to locate the eye center. Likewise, for an incoming data rate of 622 MHz only 16 of 32 taps are used. Because there is one 622 MHz sampler clock cycle for each 622 MHz data cycle, a total of 16 samples out of 32 are thus used to locate the eye center. Likewise, for an incoming data rate of 1.2 GHz all taps are used. Because there are two 1.2 GHz data cycles for each 622 MHz sampler clock cycle a total of 16 samples are thus used to locate the eye center. Finally, for an incoming data rate of 1.2 GHz all taps are used. Because there are four 2.4 GHz data cycles for each 622 MHz sampler clock cycle a total of only 8 samples are used to locate the eye center. Thus, this method uses 16 samples per data bit for the three slowest data rates, thus simplifying device complexity while providing acceptable accuracy. For the fastest rate of 2.4 GHz the method uses 8 samples per data, an acceptable compromise for accuracy and complexity.

Figure 3:
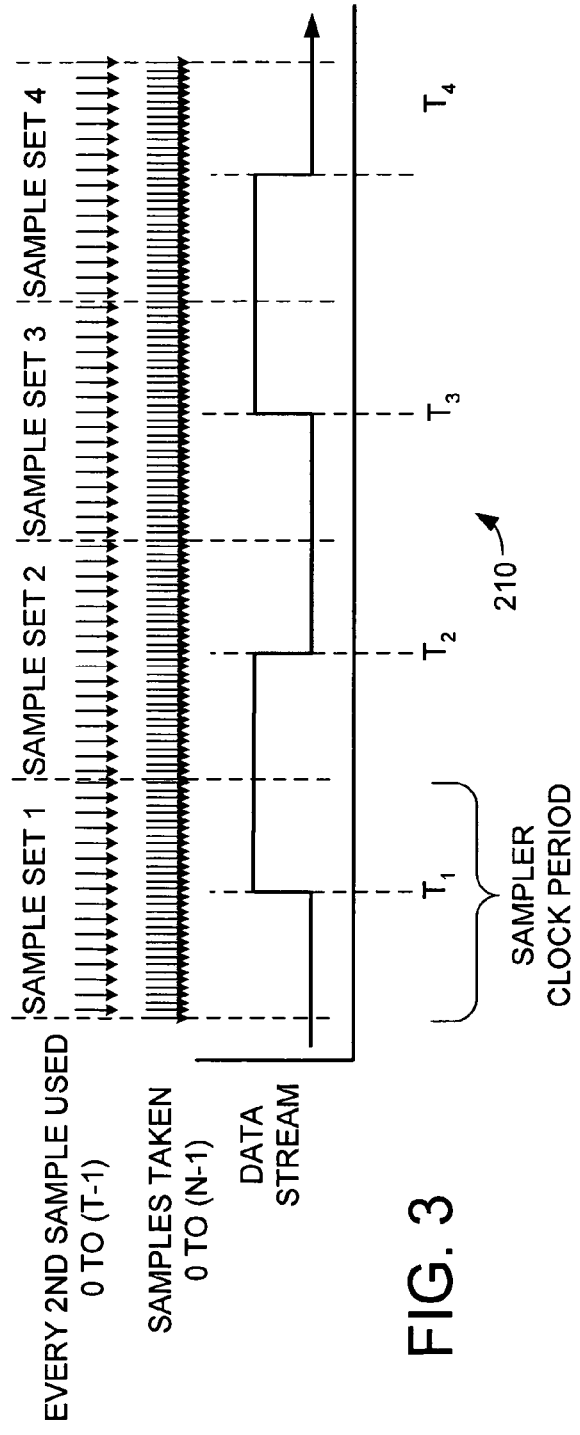
Figure 4:
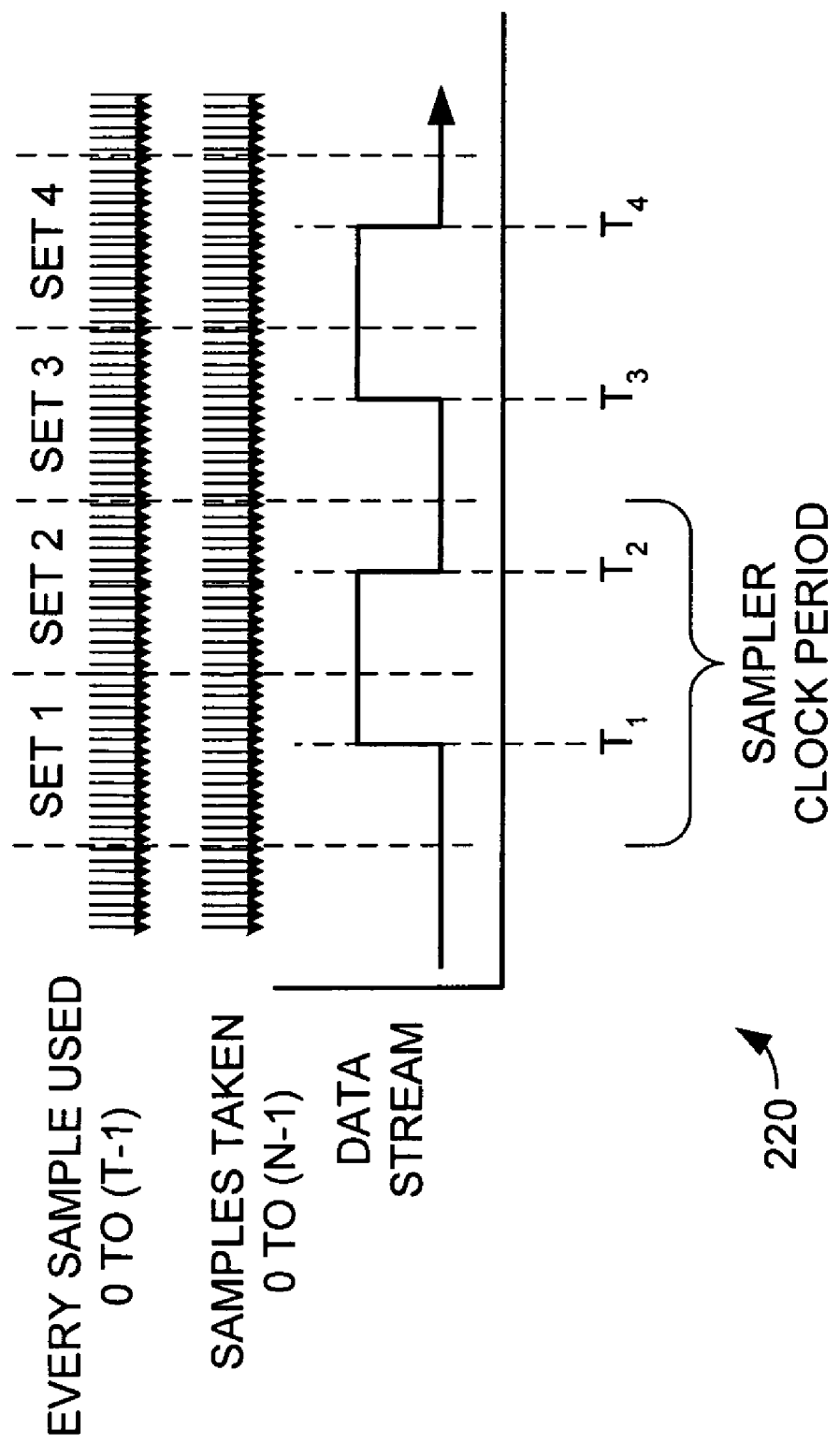
Figure 5:
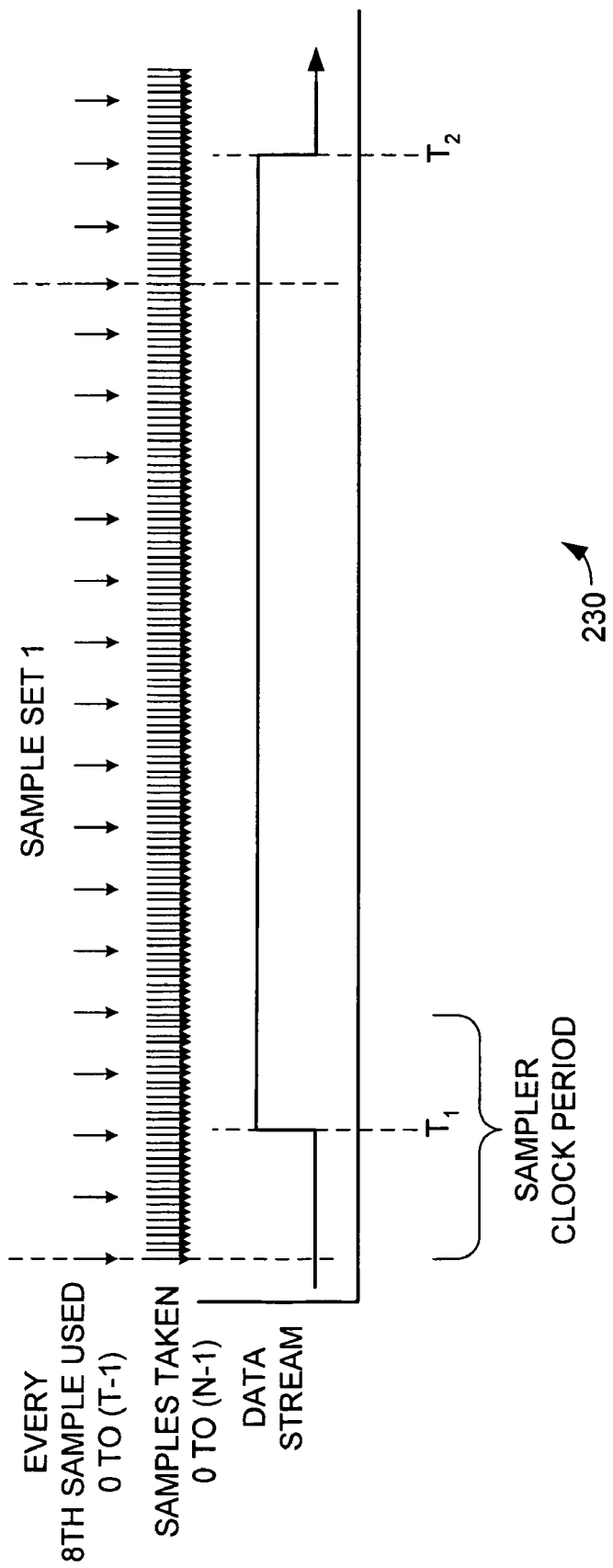

Turning now to FIGS. 3-5, three more exemplary incoming data streams are illustrated. These three examples show how data rates of different speed can be sampled by one sampler. In the three examples the sampler uses the same sampler clock period for all three data rates. Additionally, in all three examples the samples are grouped into sets. Specifically, each sample set corresponds to selected samples that span one bit time of the data stream, with each of the sample sets having the same number of samples. As described above, using sample sets of the same size can reduce device complexity by simplifying the logic needed to handle the different data rates.

Referring now to FIG. 3, a second exemplary incoming data stream is illustrated in graph 210. In the example illustrated in FIG. 3, 32 samples are taken during each sampler clock period, which is equal to a bit period in this example. Thus N (the number of samples per sampler clock period) and T (the width of the data bit in samples) are both 32. However, in this example only a portion of the samples (16) are included in the sample set that corresponds to one bit time, and will be used for training. The 16 samples would each be identified by the tap number, where the tap numbers correspond to the taken 32 samples. Thus, the 16 samples used would correspond to tap numbers 0, 2, 4, 6, 8, etc.

Turning now to FIG. 4, a third exemplary incoming data stream is illustrated in graph 220. In this example the sample rate is the same as in FIG. 3, but the data stream rate is twice as fast. In the example illustrated in FIG. 4, 32 samples are taken during each sampler clock period, which is equal to two bit periods. Thus N (the number of samples per sampler clock period) is 32 while T (the width of the data bit in samples) is 16. Again, like the previous example, there are 16 samples selected for each sample set that corresponds to one bit time. The 16 samples would each be identified by the tap number, where the tap numbers correspond to the taken 32 samples in each sampler clock period. Thus, the 16 samples used would correspond to tap numbers 0, 1, 2, 3, 4, etc.

Turning now to FIG. 5, a fourth exemplary incoming data stream is illustrated in graph 230. In this example the sample rate is the same as in FIG. 3, but the data stream rate is a quarter as fast. In the example illustrated in FIG. 4, 32 samples are taken during each sampler clock period, which is equal to one-quarter of a bit period. Thus, N (the number of samples per sampler clock period) is 32 and T (the width of the data bit in samples) is 128. Again, there are 16 samples selected in each sample set. The 16 samples would each be identified by the tap number, where the tap numbers correspond to the taken 32 samples in each sampler clock period. Thus, the 16 samples used would correspond to tap numbers 0, 8, 16, 24 . . . 120, etc.

FIGS. 3-5 thus illustrate how incoming data streams of different rates can be sampled by one sampler, and how sample sets of the same size can be grouped together and referenced by tap number.

As described above, the eye center trainer 100 receives the incoming data stream into a sampler 102 that samples the data stream. Those samples are then passed to a train controller 104 that locates the transitions in the data stream. Typically, the transitions would be located by determining which samples are adjacent to the transitions. When one sample shows a high value, and the next sample shows a low value, then a transition from high to low has occurred between the two samples. Likewise, when one sample shows a low value, and the next sample shows a high value, then a transition low to high has occurred between the two samples. Thus, the train controller 104 can locate which samples correspond to the location of the transitions, and can identify those samples by their tap number.

The train controller 104 then identifies the samples proximate to the transitions, and offsets the tap numbers for those samples based on state criteria and the number of transitions in a bit time, and loads the offset tap numbers into the accumulator 106. As one example, the controller 104 offsets the tap numbers which most closely follows the transition an amount determined by the current state and whether the transition is the first or second transition in the bit time.

The criteria and offsets used by the train controller 104 are selected to facilitate accumulation of the offset tap numbers in the accumulator 106 in such a way that the eye center of the bits is easily located. The offsets are selected to facilitate averaging of tap values without the problems that would otherwise occur for transitions that are early or late. In general, the system offsets tap values corresponding to transitions that are "on time" (i.e., in the sample set of the bit time in which they were expected) by a value T, where T is the number of samples in a bit time. Tap values corresponding to transitions that are "early" (i.e., in the bit time before they were expected) are offset by a value of 0. Tap values corresponding to transitions that are "late" (i.e., in the bit time after they were expected) are offset by a value of 2T.

Stated another way, the tap values are offset an amount O, where $O=(S-X+1)T$, where S is the bit time "number" for the tap value, X is the transition number, and T is the number of samples in a bit time. Thus, the first transition in the first set of samples would be offset $(1-1+1)T$ or T. If the second transition arrives early, also in the first bit time, it would be offset $(1-2+1)T$ or 0. If instead, the second transition arrives in the second bit time it would be offset $(2-2+1)T$ or T. Finally, if instead the second transition does not show up until the third bit time it would be offset $(3-2+1)T$ or 2T. This process starts at the first transition in the training data and is continued until sufficient transitions are located, offset and accumulated to determine the location of the bit eye center.

Figure 6:
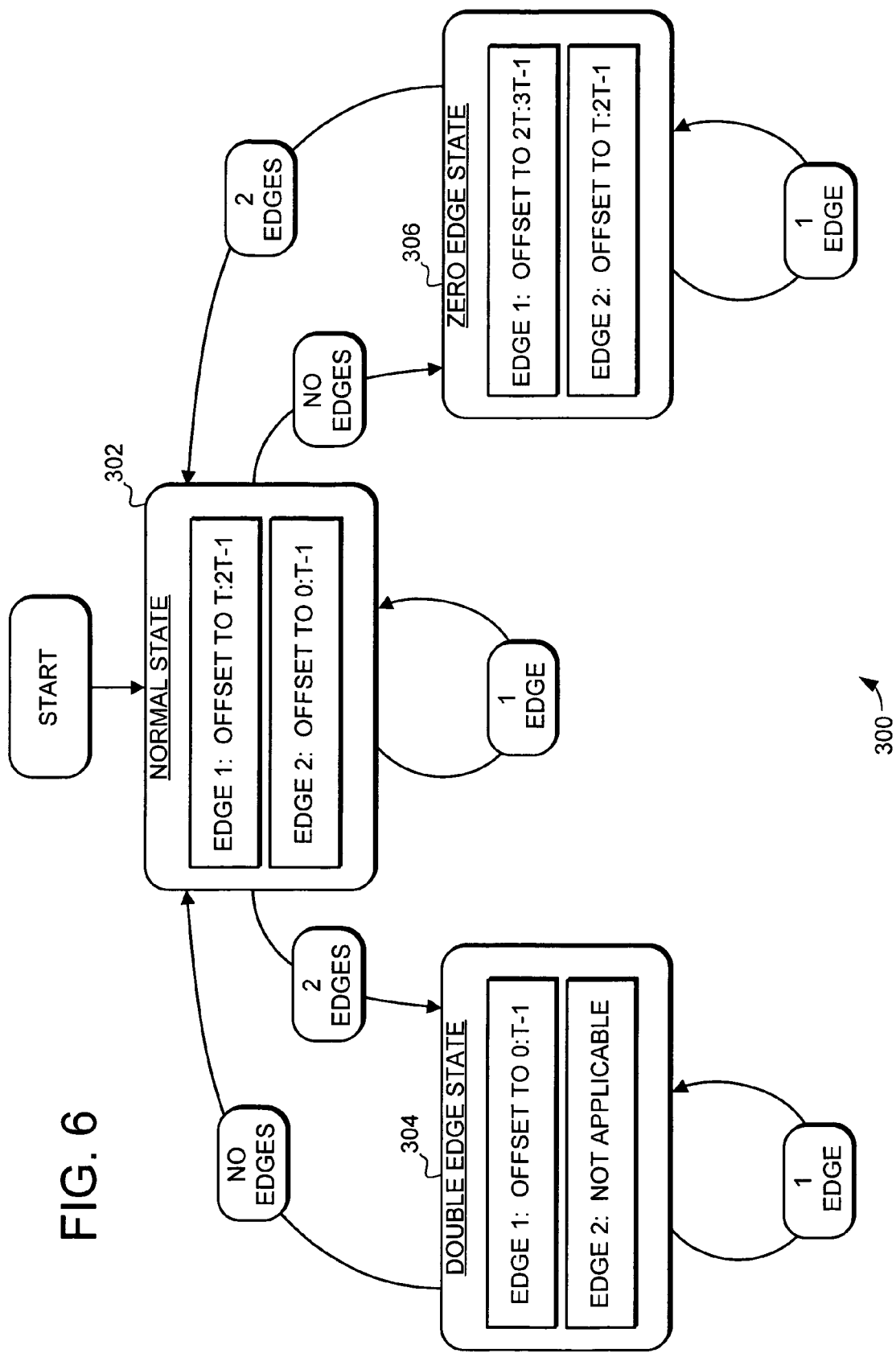
FIG. 6 is a schematic view of an offset procedure in accordance with an embodiment of the invention.

Turning now to FIG. 6, a state diagram 300 illustrates a state machine implementation of the above procedure that selectively offsets selected tap numbers. The offset of the tap numbers facilitates easy location of the eye center from the accumulator. The procedure 300 includes three states, a normal state 302, a double edge state 304, and a zero edge state 306. Each state determines how the tap numbers are offset based on the number of transitions in its set of samples that corresponds to one bit time. In this specific example, the tap numbers can be offset by amounts of 0, T, or 2T, where T is the number of samples in the sample set. For example the tap number corresponding to the first edge (i.e., transition) in a set of samples received in the normal state 302 is offset to between T and 2T−1 by adding T to the tap number.

The procedure 300 moves between states based on the number of transitions (referred to as edges in FIG. 3) found in the set of samples that corresponds to a bit time. Thus, when the procedure has seen a set of samples that equals the width of a bit in the data stream, the procedure transitions to the next state. For example, if while in the normal state 302 a set of samples has one transition the procedure 300 stays in the normal state 302. However, if while in the normal state 302 a set of samples has two transitions, the procedure moves to double edge state 304. If while in the double edge state 304 a set of samples has one transition, the procedure 300 stays in the double edge state 304. Conversely, if while in the double edge state 304 a set of samples has no transition, the procedure 300 moves to the normal state 302. It should be noted that while in the double edge state 304 a second transition will not be received in a set of transitions because that would require more transitions than are possible to receive within the bit times.

If while in the normal state 302 a set of samples has no transitions, the procedure 300 moves to the zero edge state 306. If while in the zero edge state 306 a set of samples has two transitions, the procedure 300 returns to the normal state 302. Finally, if while in the zero edge state 306 a set of samples has one transition, the procedure 300 stays in the zero edge state 306.

In each case, the tap numbers corresponding to received transitions are offset according to the rules of that state, and the offset tap numbers are added to the contents of accumulator 106. Those rules are dependent upon the number of the transitions in the set. Thus, while in the normal state, the tap number corresponding to the first transition of a set of samples is offset to the range T:2T−1 by adding T. If a second transition is located in that set of samples, its corresponding tap number is given an offset of 0 to remain in the range of 0:T−1 (and the procedure would move to double edge state 304).

As another example, while in the zero edge state 306, the tap number corresponding to the first transition of a set of samples is offset to be in the range of 2T:3T−1. If a second transition is then located in that set of samples, its corresponding tap number is offset to the range of T:2T−1 (and the procedure 300 would move to the normal state 302).

During operation, the procedure 300 starts in the normal state 302 when the first transition in the preamble training bits is located by the train controller 104. Specifically, the train controller 104 would typically be configured to continuously sample and monitor the signal for incoming data. When a new transmission of data arrives, the only bits to be passed to the eye center trainer 100 are the preamble training bits. When the first transition in the preamble training bits is sampled, the train controller 104 locates the transition and offset according to the rule for edge 1 in the normal state. Thus, the tap number for the first transition located by the controller is offset to the range T:2T−1. If a second transition is found in the set of samples, that corresponding tap number is offset according to the edge 2 rule in the normal state, and the procedure moves to double edge state 304. This process continues until a selected number of transitions are located and their tap numbers are offset and added into the accumulator 106.

As described above, the criteria and offsets used by procedure 300 are designed to facilitate accumulation of the offset tap numbers in the accumulator 106 in such a way that the eye center of the bits is easily located. Specifically, in this embodiment the eye center of the bits can be easily located using the higher order bits of the accumulated values.

Figure 7:
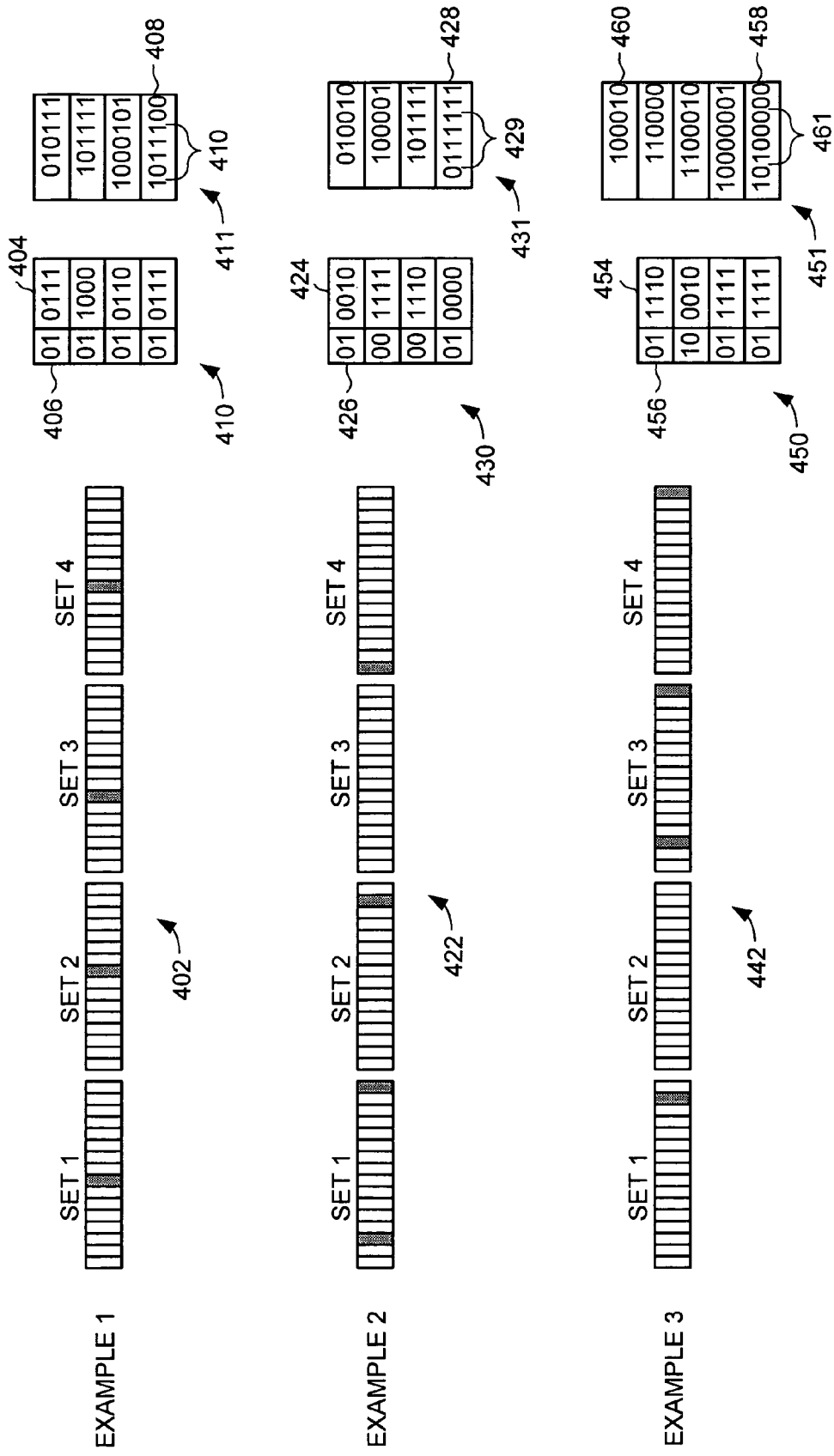
FIG. 7 is a schematic views of exemplary data sets in accordance with an embodiment of the invention.

In the general sense the accumulator determines the location of the eye center by averaging the location of the transitions, as offset according to the procedure described above. The result is a value that corresponds to the average location of the transition in the bit stream. From this, the eye center of the bit for the data stream can be easily calculated by selecting the tap number that is one-half a bit time away from the average transition location. Turning now to FIG. 7, three exemplary training data sets 402, 422 and 442 are illustrated graphically, along with the examples of accumulating their offset values. In these examples, each training data set includes four sample sets, with each sample set corresponding to one bit time and including 16 samples, each sample being identified by a tap number of between 0 and 15, and T has a value of 16.

The samples immediately following a detected transition are indicated with shaded boxes. For example, in data set 402, transitions were located in the sample at tap number 7 of sample set 1, tap number 8 of sample set 2, tap number 6 of sample set 3 and tap number 7 of sample set 4. In this relatively simple example there is one transition in every sample set. In procedure 300 the method starts in the normal state 302, and thus the first transition in set 1 would be offset to the range T:2T−1. Because there is only one transition in each of the remaining sample sets the procedure 300 would stay in the normal state 302, meaning that each transition would be offset by the same value of 16.

The tables 410 and 411 illustrate the result of this accumulation. Specifically, the table 410 includes a column 404 of the four measured tap numbers, while column 406 shows the four corresponding offsets. The table 410 shows the values in binary, as they would be stored and processed by the accumulator. The first number in column 404, 0111, is a tap number of 7. Prefixing bits to 01 to this number results in an offset tap number of 010111, effectively offsetting the tap number by 16. Table 411 shows the running values in the accumulator when the appropriate offset is prefixed to each of the tap numbers and added into the accumulator. As illustrated in entry 408, the result of adding the values into the accumulator is 1011100. Because of the way the offset values were selected, the average of all four tap numbers can be determined using a relatively simple bit shift. Specifically, the average of all four tap numbers can be obtained by dropping the lowest two significant bits and using the next four significant bits 410. Dropping the lowest two significant bits corresponds to dividing the value in the accumulator by four, and thus results in the average transition tap number. Thus, the average of the four tap numbers is 0111, which corresponds to a value of 7. This average of the four tap numbers corresponds to the average location of the transition in the bit stream. To locate the eye center of data in the bit stream, this value is translated one half of a bit width, from the location of the transition to the eye center. This shift can be done by adding or subtracting the appropriate value to the accumulator output. Alternatively, this shift can be compensated for automatically by seeding the accumulator with an initial value, as will be described in greater detail below. Thus, by simply offsetting and accumulating four measured tap numbers the location of the eye center can be quickly obtained.

While example data set 402 illustrates a simple example of how procedure 300 works, it does not fully illustrate how procedure 300 deals with multiple transitions (or no transitions) in a sample set. Turning now to data set 422, in this example transitions are located at tap number 2 of sample set 1, tap number 15 of sample set 1, tap number 14 of sample set 2 and tap number 0 of sample set 4. Thus, this example includes two transitions in sample set 1 and no transitions in sample set 3. In procedure 300 the method again starts in the normal state 302, and thus the first transition in set 1 would be offset to the range T:2T−1. The second transition in set 1 would then be offset to the range 0:T−1. Because two transitions were located in set 1, procedure 300 moves to the double edge state 304. Thus, the first transition in set 2 is offset to the range 0:T−1. Then because there is no transition in set three, the procedure 300 moves back to the normal state 302. Then the first transition in set 4 is offset to the range T:2T−1. Thus, in this specific example the first transition would be offset by 16, the second transition would be offset by 0, the third transition would be offset by 0 and the fourth transition would be offset by 16.

The tables 430 and 431 illustrate the result of this accumulation. Specifically, the table 430 includes a column 424 of the four measured tap numbers, while column 426 shows the four corresponding offsets. The first value in column 424, 0010, is a tap number of 2. Prefixing bits 01 to this value results in an offset tap number of 010010, effectively offsetting the tap number by 16. The second value in column 424, 1111, is a tap number of 15. Prefixing bits 00 to this value results in an offset tap number of 001111. Table 431 shows the running values in the accumulator when the appropriate offset is prefixed to each to the tap numbers and loaded into the accumulator. When the appropriate offset is prefixed to each of the other two tap numbers and loaded in the accumulator, the result is 0111111 as illustrated in entry 428. Because of the way the offset values were selected, the average of all four tap numbers can be determined using a relatively simple bit shift. Specifically, the average of all four tap numbers can be obtained by dropping the lowest two significant bits and using the next four significant bits 429. Thus, the average of the four tap numbers is 1111, which corresponds to a value of 15. Again, this average of the four tap numbers corresponds to the average location of the transition in the bit stream. To locate the eye center of data in the bit stream this value is shifted one half of a bit width. Thus, by simply offsetting and accumulating four measured tap numbers the location of the eye center can be quickly obtained.

To further streamline this process, it is possible to directly calculate the eye center from the accumulated values, without requiring a separate operation to translate one-half bit width of the accumulator output. This can be accomplished by initializing the accumulator with a value that corresponds to the number of transitions in the data times one-half of the bit width. When the accumulator is initialized with such a value, dropping the lowest two significant bits and using the next four significant bits will result in an accumulator output value corresponding directly to the eye center of the bits.

Furthermore, the result can be further refined to compensate for the difference in time between samples in the sample sets. Specifically, each sample actually represents a portion of the bit time. For example, with 16 samples, each sample actually represents 1/16 of the bit time. To more accurately determine the precise eye center of the bit, it is desirable to assume that the transition actually occurred in the middle of the sample gap before the transition was detected, rather than to assume that the transition occurred at one edge of the gap. This assumption can be implemented by initializing the accumulator with an additional amount equal to the number of taps equivalent to one-half of the time between samples multiplied by the number of transitions. When divided by dropping the lowest significant bits, this results in an accumulator output that corresponds more accurately to the eye center of the bit stream. Thus, by initializing the accumulator with a value to compensate for the sample time, and to translate to the eye center, the system can directly and accurately determine the eye center.

Turning now to data set 442, in this example samples were located in the sample at tap number 14 of sample set 1, tap number 2 of sample set 3, tap number 15 of sample set 3 and tap number 15 of sample set 4. Thus, this example includes one transition in sample set 1, no transitions in sample set 2, two transitions in sample set 3 and one transition in sample set 4. In procedure 300 the method again starts in the normal state 302, and thus the first transition in set 1 would be offset to the range T:2T−1. Because there are no transitions in sample set 2, the procedure moves to the zero edge state 306. Thus, the first transition in set 3 is offset to the range 2T:3T−1. Then, the second transition in set 3 is offset to the range T:2T−1. Because there were two transitions in set 3, the procedure 300 returns to the normal state 302. Thus, the transition in set 4 is offset to the range T:2T−1. Thus, in this specific example the first transition would be offset by 16, the second transition would be offset by 32, the third transition would be offset by 16 and the fourth transition would be offset by 16.

The tables 450 and 451 illustrate the result of offset and accumulation. Specifically, the table 450 includes a column 454 of the four measured tap numbers, while column 456 shows the four corresponding offsets. The first value in column 454, 1110, is a tap number of 14. Prefixing bits 01 to this value results in an offset tap number of 011110, effectively offsetting the tap number by 16. The second value in column 454, 0010, is a tap number of 2. Prefixing bits 10 to this value results in an offset tap number of 100010, effectively offsetting the tap number by 32. The appropriate offset is likewise prefixed to each of the other two tap numbers. Additionally, table 451 shows an initial value 460 loaded into to the accumulator to compensate for the sample time and to translate to the eye center directly. Table 451 then shows the running values in the accumulator when the appropriate offset is prefixed to each of the tap numbers and loaded into the accumulator.

Specifically, in this example there are four transitions in the data set, and the initial value is thus equal to 4 times one-half the bit time plus 4 times the time between samples. In this example, one-half of a bit time is equal to 8, and 4 times this value is 32. The time between samples is 1 tap number, and 4 times one-half of this value is 2. Thus, the accumulator is initialized with a value of 34, or 100010, as illustrated in entry 460. When loaded in the accumulator with the accumulated and offset tap numbers the result is 10100000 as illustrated in entry 458. Because of the way the offset values were selected and accumulated, and because of the initial values loaded to the accumulator, the average of the eye center can be determined directly using a relatively simple bit shift of this output. Specifically, dropping the lowest two significant bits and using the next four significant bits 461 results in the tap number that corresponds to the bit eye center. In this case, four bits are 1000, which corresponds to a value of 8. This value corresponds directly to the eye center of the data bits in the data stream.

It should be noted that while in the above three examples four transitions are located and used to determine the bit eye center, that more or fewer transitions can be used. For example, the system can use two transitions. When using two transitions, a bit shift of one bit in the accumulated data will provide the average location, although with lower accuracy. As another example, the system could use eight transitions, and use a bit shift of three bits in the accumulated data. This would provide increased accuracy, but may not be feasible in cases where there are not eight transitions available for data training or there is not time to wait for the analysis of eight transitions. Furthermore, the greater accuracy might not be required by the system which uses the recovered data.

Figure 8:
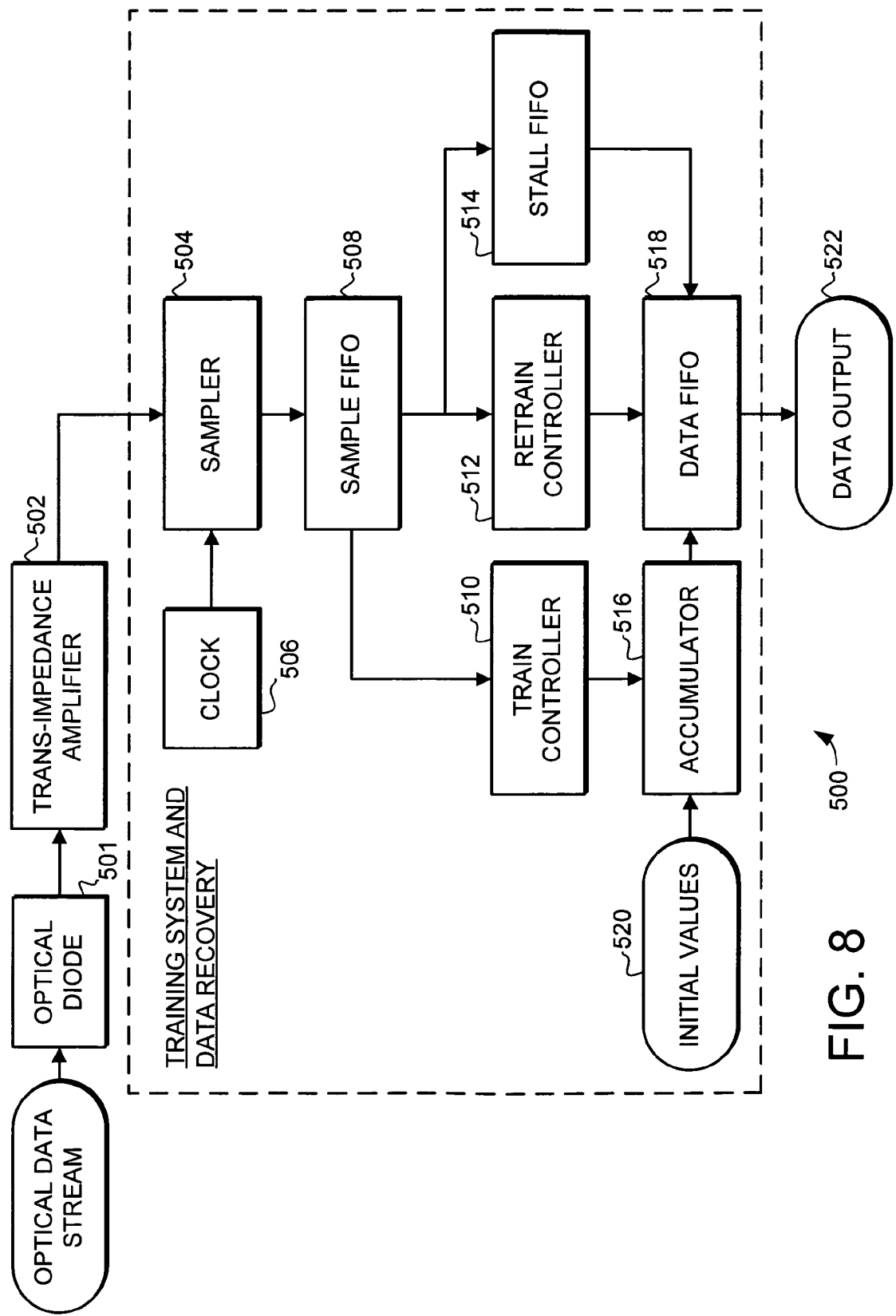
FIG. 8 is a schematic view of a training system in accordance with an embodiment of the invention.

Turning now to FIG. 8, a schematic view of an exemplary eye center training system 500 is illustrated. The eye center training system 500 is one example of the type of system that can be implemented to sample an incoming data stream to determine where transitions in the data stream occur, selectively offset the selected samples based on state criteria and the number of transitions in each set of samples, accumulate the offset samples and average the result to determine the center of the bit eye. Additionally, the eye center training system 500 provides the ability to receive and locate the eye center of data streams of different frequencies without requiring excessive circuitry.

The eye center training system 500 is particularly applicable to burst mode communication systems. In such systems multiple clients (e.g., 32 clients) transmit on the same fiber or wire, each during an assigned time slice. Each transmission in a time slice is generally referred to as a burst. Because these clients can be very remote they will typically not be in phase with the receiver or with each other, and the phase differences between clients and receivers will be unknown. Because the relative phases of clients and receivers are unknown, the training system needs to be able to accurately determine the location of bits for each burst of data. Otherwise it cannot be assured that the incoming data is sampled at the correct locations, and thus the reliability of the sampling and accuracy of the recovered data cannot be assured.

In a typical burst mode communication system, each burst of data is formatted into a packet that includes a set number of preamble data bits followed by a larger number of actual data bits. The preamble data bits provide the transitions that are to be used by the system to recognize the incoming data and locate the eye center. These preamble bits typically have a known pattern, such as alternating transitions between every bit, with that known pattern used for training. In some cases, the first preamble bits are used by the receiver's amplifier and thus only a portion of the preamble bits are available for eye center training. Because of the limited number of transitions available for training, it is desirable for the system to provide the ability to locate the eye center using only a few bits of data or within a few transitions. This allows the system to locate the eye center using the available preamble bits, before actual data bits that need to be sampled for data recovery and passed to the receiver's system begin to arrive.

In this illustrated embodiment, the training system 500 receives data from an optical data stream, such as from a burst mode Passive Optic Network (PON). Of course, the system could be adapted to receive data from other types of networks, including non-optical networks. The training system 500 will be described as working for data signals of 155 MHz, 622 MHz, 1.2 GHz and 2.4 GHz. Of course, these are just examples of the types of data stream frequencies to which the system could be applied, and some implementations could thus include more, less or different frequency capability.

The eye center training system 500 includes a sampler 504, a clock 506, a sample FIFO 508, a train controller 510, a retrain controller 512, a stall FIFO 514, an accumulator 516, and a data FIFO 518. An optical data stream is received by an optical diode 501 and trans-impedance amplifier (TIA) 502. The optical diode receives the optical signal and converts it into an appropriate electrical signal. The trans-impedance amplifier 502 receives the electrical data signal and amplifies it, passing the amplified data stream to the sampler 504. It should be noted that one issue in determining the eye center of bits in the data stream is the presence of odd/even noise in the data stream. In this example one potential source of odd/even noise is limitations in the performance of the trans-impedance amplifier 504. Because the system 500 averages the locations of the consecutive detected transitions and uses the averages to determine the eye center of the bits, the system is able to negate the effects of odd/even noise. Thus, the system 500 is able to accurately determine the eye center of bits in the data stream even in the presence of odd/even noise.

The clock 506 provides multiple phases of a clock signal to the sampler 504. The phases of the clock are used to determine when the sampler 504 samples the data stream. In one specific embodiment, the clock comprises a phase locked loop that generates 16 phases of a 622 MHz clock. The clock phases are passed to the sampler, which uses those phases to sample the data stream.

In one embodiment, the sampler uses the 16 phases to take 32 samples of the data stream during each clock cycle of 622 MHz clock. It should be noted that in this embodiment the sampler would take 128 samples per bit for a 155 MHz data stream, 32 samples per bit for a 622 MHz data stream, 16 samples per bit for a 1.2 GHz data stream and 8 samples per bit for a 2.4 GHz data stream.

The samples are passed from the sampler 504 to the sample FIFO 508. The sample FIFO 508 stores the samples long enough for the system to determine which sample is the correct sample to use for data recovery. In one embodiment the samples are passed to the sample FIFO 508 in groups of 32, and the sample FIFO 508 stores 24 groups of 32 samples.

The sample FIFO 508 outputs to the train controller 510, the retrain controller 512, and the stall FIFO 514. The train controller 510 receives the samples from the sample FIFO 508 when a new burst starts and continues receiving samples until training completes. The train controller 510 uses these samples to determine the location of the eye center in those bits. The retrain controller 510 and stall FIFO 514 receive samples from the output of the sample FIFO 508 after training completes. Thus, the retrain controller 510 and the stall FIFO 514 do not receive the samples until the system is able to determine the eye center for those data bits.

In some embodiments, only a selected portion of the samples or taps are used by the train controller 510. For example, a portion of the samples are selected to provide a selected number of samples per bit. In one specific embodiment the samples are selected such that 16 samples are provided to the train controller 510 for each bit for 155 MHz data streams, 622 MHz data streams, and 1.2 GHz data streams, while 8 samples are provided for each bit for 2.4 GHz data streams. This helps simplify the operation of the train controller 510 by allowing the same procedures to be applied for different rate data streams.

As described above, in this embodiment the sampler takes 128 samples per bit for a 155 MHz data stream. Because only 16 of these samples are used by the train controller 510, the system is only using one out of every eight samples at this speed. Likewise, because the sampler takes 32 samples per bit for a 622 MHz data stream, the system uses only one out of two samples at this data speed. Because the sampler takes 16 samples per bit for a 1.2 GHz data stream the system uses all of the samples at the this speed. Finally, because the sampler takes 8 samples per bit for a 2.4 GHz data stream the system uses all of the samples at this data speed.

It should be noted that in such a system, at the slower speeds each sample represents a greater amount of time. As a result, the required accuracy of the analysis is much lower. For example, at 155 MHz, each bit is 6.4 ns wide, while at 2.4 GHz, each bit is 400 ps wide. Using 16 samples for 155 MHz means that the samples are spaced every 400 ps. Out of 6.4 ns, an error of a few hundred ps is typically acceptable so using only 16 samples is sufficient. However, applying the sample rate to 2.4 GHz would result in only one sample per bit, which is clearly insufficient. For higher speed data streams more closely spaced samples are desirable in order to maintain the same margin of error. In one embodiment, 16 samples are used for each bit at the speeds of 155 MHz, 622 MHz, and 1.2 GHz, while only 8 samples are used for 2.4 GHz due to the decision to limit the required frequency at which the sampler has to operate. While this reduces the accuracy of the results at 2.4 GHz relative to the results at the other frequencies, it can be an acceptable risk for some applications.

Each of these groups of samples is passed to the train controller 510 as a set of samples. As described above with reference to FIGS. 1-3, the train controller 510 then locates the transitions by identifying the samples between which the transitions occur, and offsets the tap numbers corresponding to the transitions based on state criteria and the number of transitions in a sample set that corresponds to a bit time. The criteria and offsets used by the train controller 510 are selected to facilitate accumulation of the offset tap numbers in the accumulator 516 in such a way that the eye center of the bits is easily located. Specifically, the criteria and offsets are selected such that eye center of the bits can be located by using higher order bits of the accumulated tap numbers in the accumulator 516.

In the illustrated embodiment, the accumulator 516 is loaded with initial values 520 to facilitate direct eye center determination and to compensate for the difference in time between the selected samples. As described above, direct eye center determination can be facilitated by initializing the accumulator 516 with a value that corresponds to the number of transitions used times the number of taps corresponding to one-half of the bit width. To compensate for the difference in time between selected samples, the accumulator 516 is further initialized with an additional amount equal to number of transitions used times one-half of the number of taps between samples.

In the specific embodiment being discussed there are four transitions in the preamble that are used for training and the initial value is thus equal to 4 times the number of taps corresponding to one-half the bit time plus 4 times the number of taps between samples. When the samples are added in the accumulator 516 with the appropriate offsets and initial value the average of the eye center is determined directly using a bit shift of this output. Specifically, dropping the proper number of least significant bits and using the required number of significant bits results in the sample tap number that corresponds to the bit eye center as determined from four transitions. These selected bits correspond to the eye center of the data stream and are passed to the data FIFO 518, where it they are used to identify which samples in each group of samples are to be used for data recovery from the data stream.

Using the specific examples introduced above, at 155 MHz, there are 128 samples per bit time. Four times half of this is 256. There are 8 taps between samples that are used, so four times half of this is 16. This yields a total initial value of 272, or, in binary, 100010000. The eye center can then found by dropping the two least significant bits and using the next 7 significant bits, as the seven bits are used to select the one tap of 128 that corresponds to the bit eye center.

At 622 MHz, there are 32 samples per bit time. Four times half of this is 64. There are 2 taps between samples that are used, so four times half of this is 4. This yields a total initial value of 68. However, further optimization can be achieved by using the fact that 622 MHz is exactly four times 155 MHz and 68 times 4 is 272. Thus, by shifting the meaning of things by two bits, the circuitry can be shared with the 155 MHz circuitry. Hence, the same initial value of 272 can be used for 622 MHz when compensated for by using different significant bits to determine the bit eye center. Specifically, using the same initial value of 272, the bit eye center can be taken from two bits further to the left than the answer for the 155 MHz case. The eye center at this data rate is thus found by dropping the four least significant bits and using the next five significant bits, where five bits are required to select one tap of 32.

At 1.2 GHz, there are 16 samples per bit. Four times half of this is 32. There is 1 tap between samples that are used, so four times half of this is 2. This yields a total initial value 34. Again, realizing that 1.2 GHz is 8 times 155 MHz, and 34 times 8 equals 272, shifting by three will again allow reuse of the circuitry and the same initial value of 272. The eye center at this data rate is thus found by dropping the five least significant bits and using the next four significant bits, where four bits are required to select one tap of 16 and the same relative tap is used for both bits received per sample clock.

At 2.4 GHz, there are 8 samples per bit. Four times half of this is 16. There is 1 tap between samples that are used, so four times half of this is 2. This yields a total of 18. Again, realizing that 2.4 GHz is 16 times 155 MHz, and that 18 times 8=288, shifting by four allows reuse of the circuitry and the same initial value of 272 if a small risk of error due to the difference between 288 and 272 is acceptable. If the small risk is not acceptable, then an initial value of 288 could be used. In either case, the eye center at 2.4 GHz is thus found by dropping the six least significant bits and using the next three significant bits, with the three bits used to select one tap of 8, and the same relative tap is used for all four bits received per sample clock The data FIFO 518 receives the samples though the stall FIFO 514 and selects the samples that will be used for data recovery based on the output of the accumulator 516. Thus, the data FIFO 518 selects the samples that correspond to the eye center of the data, as indicated by the selected higher order bits of the accumulator 516 output. The recovered bits are accumulated into data words of specified widths and passed out of the data FIFO 518 to the data output 522. The size of these data words would typically depend on the rate of the incoming data stream and the required output data rate. For example, if the desired output clock frequency is 155 MHz, for 155 MHz data, the data FIFO 518 will output one bit per 155 MHz period. For 622 MHz data, the data FIFO 518 will output four bits per 155 MHz period. For 1.2 GHz, the data FIFO 518 will output eight bits per 155 MHz period. For 2.4 GHz, the data FIFO 518 will output 16 bits per 155 MHz period.

The data FIFO 518 also serves to buffer the data stream to provide output data at a constant rate. The data FIFO 518 would typically be configured to accumulate some amount of data before it begins to output data. This allows the data FIFO 518 to supply output data at a desired rate even if the transmitter is sending data slower than normal. Additionally, the data FIFO 518 would provide the ability to accumulate data if the transmitter is sending data faster than normal. Thus, the data FIFO 518 compensates for overrun and underrun by the transmitter, buffering the output to provide the receiver with the expected consistent stream of data.

As described above, the sample FIFO 508 also outputs to the retrain controller 512 and the stall FIFO 514. The retrain controller 512 operates after the eye center has first been located by the train controller 510. Thus, the retrain controller 512 operates to correct for drift that may occur in the data stream burst as later data bits are received. In general, the retrain controller compares the locations of the transitions with the expected transition location and adjusts the tap number used for data recovery accordingly. The stall FIFO 514 buffers the samples and passes the samples to the data FIFO 518. The purpose of the stall FIFO 514 is to stall the sample data such that it arrives at the data FIFO 518 at the same time as a decision is reached by the retrain controller 512 for that data. Thus, the retrain controller 512 and stall FIFO 514 provide the ability to accurately locate the eye center of data bits throughout the burst of data.

Figure 9:
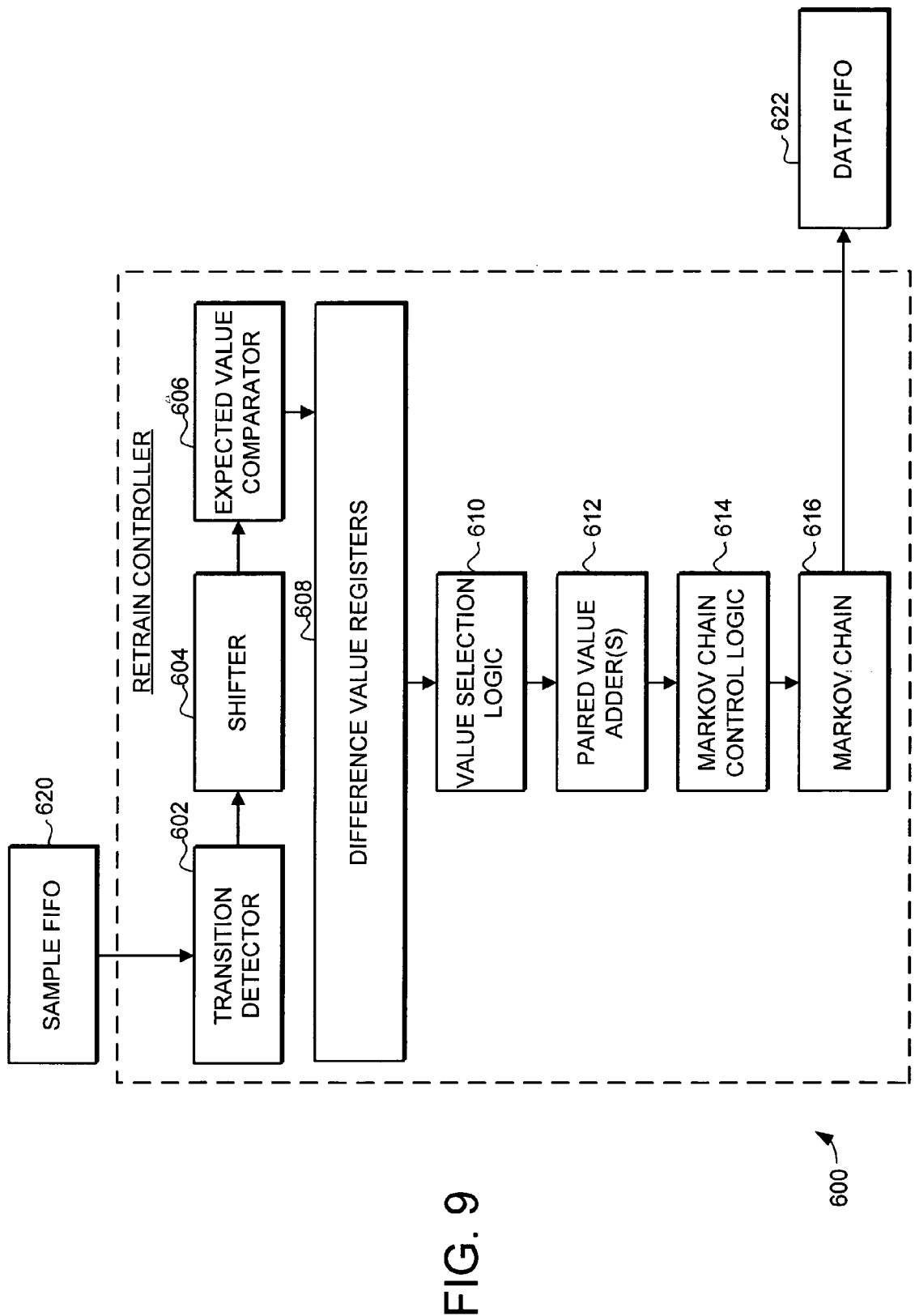
FIG. 9 is a schematic view of a retrain controller in accordance with an embodiment of the invention.

Turning now to FIG. 9, an exemplary embodiment of a retrain controller 600 is illustrated schematically. The retrain controller 600 is exemplary of the type of retrain controller that can be used in training system 500 illustrated in FIG. 8. The retrain controller 600 includes a transition detector 602, a shifter 604, an expected value comparator 606, difference value registers 608, value selection logic 610, paired value adder(s) 612, Markov chain control logic 614, and a Markov chain 616.

In general, the retrain controller 600 receives samples of the data stream from the sample FIFO 620, determines if the current bit eye center used to sample the data stream is still valid, and dynamically adjusts the sample point to more accurately sample the data stream.

Samples of the data stream are received at the sample FIFO 620. The sample FIFO 620 receives the samples by set, and stores several sets of samples at any given time. The sample FIFO 620 passes the samples by set to the transition detector 602. In one exemplary embodiment the sample FIFO 620 receives sets of 32 samples. The rate that sets of samples are delivered would typically depend upon the rate of the sampler clock used to generate the samples. As one example, the sample sets could arrive at a rate of 622 MHz as determined by the sampler clock. It should be noted that in this example the number of possible transitions in the samples would depend upon the data rate of the incoming data stream. It should also be noted that the number of samples per data stream bit time would also thus likely vary. Using the above example embodiment, the sample FIFO 620 would receive 128 samples per bit time for 155 MHz data, 32 samples per bit time for 622 MHz data, 16 samples per bit time for 1.2 GHz data, and 8 samples per bit time for 2.4 GHz data.

The transition detector 602 compares the samples in each set to locate any transitions in the set. This can be accomplished by XOR'ing each pair of adjacent samples in the set. The result of this operation is a transition bit that identifies if a transition occurred at that tap value. Specifically, this results in a "one" transition bit at every bit location where the sample value differed from the previous value, and a "zero" transition bit every where else. Of course, this is just one method of determining and indicating the presence of a transition in the samples. For example, the system could instead place a "one" transition bit where the sample value differs from the next value, and a "zero" every where else. Again, the number of transitions located in a set of these transition bits would typically depend on the rate of the incoming data.

A set of transitions is passed to the shifter 604. In order to reduce device complexity it is desirable in some applications to equalize the number of transition bits used at some data speeds. For example, in one embodiment, only 16 transition bits are used per data bit for the three slowest data rates (155 MHz, 622 MHz and 1.2 GHz). This simplifies device complexity, while providing acceptable accuracy. For the fastest rate of 2.4 GHz, this embodiment uses 8 samples per data, an acceptable compromise for accuracy and complexity. The number of transition bits can be reduced by "OR'ing" sets of adjacent bits. When this operation is performed, only the set of adjacent bits that includes the "one" transition bit will result in a value of one, and the rest will remain at zero. For example, the 128 transition bits in one bit time at 155 MHz can be reduced by OR'ing adjacent sets of eight bits together, resulting in a reduced set of 16 transition bits. The 32 bits in one bit time at 622 MHz can be reduced to 16 transition bits by OR'ing pairs of adjacent transition bits. At 1.2 GHz and 2.4 GHz all of the original transition bits would be used.

Thus, a set of transition bits is passed to the shifter 604. The shifter 604 loads the transition sets into a register. The shifter 604 shifts the transition sets such that the expected location of the transitions in the set are at specific, known locations in the register. This facilitates quick determination of movement in the bit eye center. It should be noted that shifting greatly simplifies retraining by taking advantage of the realization that only one transition is going to be found between any two samples. This means that retraining can be accomplished without attempting to account for multiple transitions between samples, greatly simplifying the logic needed to retrain.

Turning briefly to FIGS. 10-13, schematic views of sets of transition bits and a shift register are illustrated. Specifically, FIG. 10 illustrates a first set (set 1) of 32 transition bits 702 and a 64-bit register 708. In this example, the transition bits 702 include one transition bit 704 corresponding to a transition that was located in the set of samples. Also illustrated in transition bits 702 is the bit location of expected eye center 706. Register 708 is illustrated showing the expected transition location 710 and the expected eye center location 712.

As described above, shifter 604 loads the transition bits into a register shifted such that the expected location of the transitions in the transition set are at specific known locations in the register. Turning now to FIG. 11, the register 708 is shown loaded with the first set of 32 transition bits. The transition bits 702 are loaded into the register 708 such that the bit location of the expected eye center 706 is loaded to the expected eye center location 712. The expected eye center 706 will vary with the actual location of the data bit relative to the sampler clock, but the expected eye center location 712 will remain fixed. As can be seen in FIG. 11, the located transition bit 704 is one bit to the right of the expected location 710. This indicates drift in the eye center of the data stream.

Figure 12:
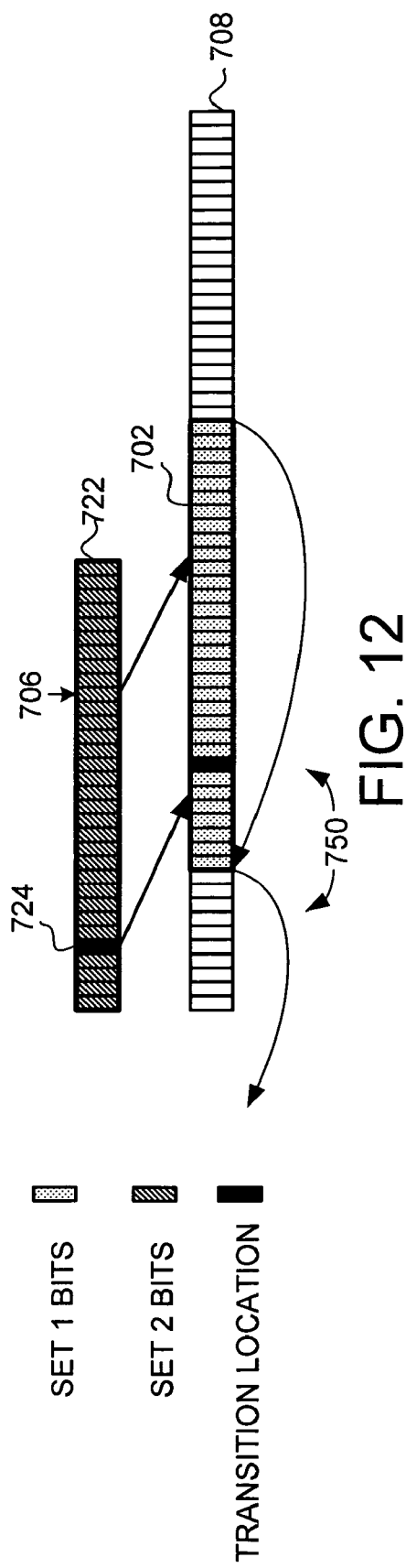

As more sets of transition bits come in they are loaded into the register, and the previous bits are shifted left. Turning now to FIG. 12, a second set (set 2) of transition bits 722 is illustrated along with the 64-bit register 708 that already includes the previously loaded transition bits 702. In this example, the transition bits 722 include one transition bit 724 corresponding to a transition that was located in this set of samples. Also illustrated in transition bits 722 is the bit location of expected eye center 706.

Figure 13:
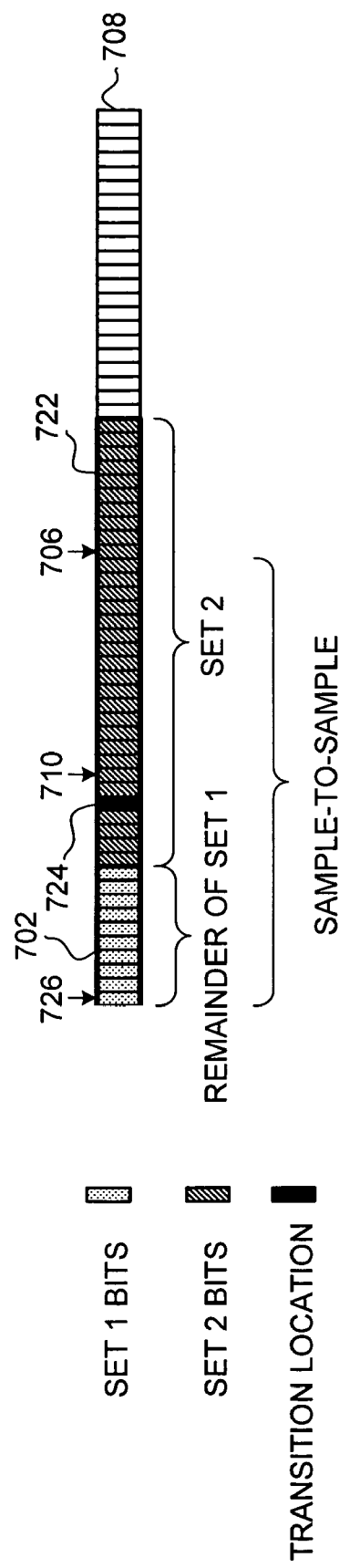

Again, the shifter 604 loads the transition bits into a register shifted such that the expected location of the transitions in the transition set are at specific known locations in the register. Furthermore, previously loaded transition bits are shifted to the left to accommodate the new bits, as illustrated by arrows 750. Turning now to FIG. 13, the register 708 is shown loaded with the second set of 32 transition bits 722. As can be seen in FIG. 13, the located transition bit 724 is two bits to the left of the expected location 710.

The first set of transition bits 702 has been shifted left, with only a portion of the first set 702 remaining in the register 708. It should be noted that in this example, the transition bit now at location 726 corresponds to the bit in the first set 702 that was at the expected location of the eye center. Typically, the shifted transition bits would be passed to the expected value comparator 606 in sets that extend from expected eye center to expected eye center, or stated another way, from sample point to sample point minus one. This facilitates easy determination of movement in the eye center of the data stream.

Specifically, shifting and loading the transition bits such that the expected value of the transition is in a known place facilitates the use of relatively quick logic to determine the direction and magnitude of how far the transition is from where it was expected. For example, if after loading into the register the actual location of the transition is two bits from the expected location, then the magnitude of movement can be easily determined using simple logic to be 2, with the sign determined by the direction of movement. Conversely, without this shift a more computationally complex and time consuming subtraction would be required to determine the movement.

It should be noted that the expected value of the transition is determined by the current bit eye center that is being used to recover data. Specifically, the expected value of the transition is half a bit time from the sample point. Thus, this value would initially be determined by the training system and could also have been previously updated by the retrain controller 600.

Returning to FIG. 9, the expected value comparator 606 compares the actual location of the transitions with the expected value of the transitions, and outputs a difference value representing the difference between the expected location and the actual location. In one embodiment, the difference value is a positive or negative number, depending on the direction of difference. Thus, if the actual transition location is one bit to the left of the expected location, the difference value would comprise negative 1. If the actual transition location is two bits to the right, the difference value would comprise positive 2. If the actual transition location is at the expected location, then the difference value would comprise zero. Thus, in the example of FIGS. 10-13, the difference value for transition bit 704 would comprise positive 1, and the difference value for transition bit 724 would comprise negative 2.

It should be again noted that while the examples illustrated in FIGS. 10-13 show only one located transition in each transition bit set, that this would not always be the case. Again, in the example discussed above for 1.2 GHz, data as many as two transitions will occur every sample set, and for 2.4 GHz data as many as four transitions will occur every sample set. In those cases the expected locations of the transitions would be separated by 16 or 8 bits, and the expected value comparator 606 could compare each located transition with its expected value in the register simultaneously, and would create a plurality of difference values during each clock cycle.

Returning to FIG. 9, the difference values are passed to the difference value registers 608. The difference value registers 608 store difference values as they are generated by the expected value comparator 606, and make the difference values available to the value selection logic 610.

The rate at which difference values become available in the difference value registers 608 again depends upon the incoming data rate and the number of transitions in the sampled portion of the data stream. Thus, at 155 MHz it will take at least 8 cycles of a 622 MHz sample clock to generate a pair of difference values. In fact, it may take significantly more cycles due to the fact that data stream could include many consecutive data bits without transitions between them. When a difference value is loaded in the difference value registers 608 and no other difference value is available, that "odd-numbered" difference value is stored in the register until the next transition and its difference value arrives. In general, you need one more difference value register than the number of transitions which can occur in one clock cycle.

At 2.4 GHz it is possible for two pairs of transitions to be available each 622 MHz clock cycle. Again, in some cases due to drift or consecutive bits without transitions, an odd number of difference values will arrive during a clock cycle. In those cases the last remaining difference value is again kept in the difference value registers 608 until the next transition arrives and a difference value is available to pair with.

Thus, the value selection logic 610 selects pairs of difference values from the difference value registers 608 as they become available. Specifically, the value selection logic 610 selects consecutive pairs of difference values. Thus, the value selection logic 610 selects a difference value for a 0 to 1 transition and a 1 to 0 transition, regardless of how many bits of data have been between the transitions.

The pair value adders 612 sums the selected pair or pairs of difference values together. When added together, the pairs of difference values produce an adjustment value that corresponds to how far the current eye center used to sample data is from the actual eye center. For example, if the first transition is one bit to the left, its difference value would be negative 1, and if the second transition is two bits to the left its difference value would be negative 2, and the sum of the pair, the adjustment value, would be negative 3. As a second example, if the first transition is three bits to the right, its difference value would be positive 3, and if the second transition is two bits to the left, its difference value would be negative 2, and the sum of the pair would be positive 1. These adjustment values are then used to selectively shift a Markov chain to adjust the sample point, as will be discussed in greater detail below.

It should be noted that if both difference values in a pair are 0, or if they have the same magnitude with an opposite sign, then the sum of the pair, and hence the adjustment value, will be 0. A zero adjustment value corresponds to the "center," meaning that the current sample point is correct based on those transitions.

It should also be noted that the use of a sum of a pair of difference values compensates for the presence of odd/even noise in the data stream. Specifically, because a pair of difference values is used, a constant amount is effectively subtracted from half the numbers and the same amount is added to the remaining half. Thus, the resulting average is not affected by the odd/even noise and the retrainer is able to accurately determine the eye center of bits in the data stream.

The paired value adders 612 preferably include as many adders as needed to handle the largest number of pairs which can be generated in one clock cycle. In the example discussed above, an adder would be used to add difference values at 155 MHz, 622 MHz, and 1.2 GHZ. At 2.4 GHz it is possible to get two pairs of difference values per sampler clock. Thus, for 2.4 GHz an adder is used for one pair, and a second adder would be used to add the second pair of difference values that could be generated in one clock cycle at this speed. Using the second adder allows the second pair to be added in parallel with the first pair. Otherwise there would be the potential to lose data at this speed.

The adjustment value(s) are passed to the Markov chain control logic 614. The Markov chain control logic 614 uses the adjustment values to shift right or shift left the Markov chain 616, which is in turn used to adjust the sampling tap used by the data FIFO 622 to recover data. The Markov chain control logic 614 preferably looks at the magnitude and sign of the adjustment value to determine how to shift the Markov chain 616. As one example, if the adjustment value is positive, the Markov chain control logic 614 shifts the Markov chain 616 to the right. Conversely, if the adjustment value is negative, the Markov chain control logic 614 shifts the Markov chain 616 to the left.

The Markov chain control logic 614 can look at the magnitude of the adjustment value to determine how much to shift the Markov chain 616. In one example, the Markov chain control logic 614 is configured to select one magnitude if the adjustment value is less than ¼ of a bit width, and to double the shift if the adjustment value corresponds to greater than ¼ of a bit width and less than ½ of a bit width. The bit width again is determined by the data rate. So at 155 MHz, ¼ of a bit width would correspond to a difference value of 4 (when a reduced set of 16 transition bits is used). Thus, if the adjustment value is greater than 4 (or less than −4) the Markov chain control logic 614 would double shift the Markov chain 616. Adjustment values that correspond to more than ½ a bit are actually on the other side of the sample point. Thus, these transitions may actually correspond to an adjacent bit transition.

The Markov chain 616 is a shift register which effectively acts as a low pass filter. Specifically, when training completes the Markov chain 616 is initialized with a "1" in the center position and a "0" in all other positions. It is then shifted left or right by the Markov chain control logic 614 as adjustment values are received by the logic 614. Thus, in the 155 MHz embodiment discussed above, if the adjustment value is 0, the Markov chain 616 is not shifted. If the adjustment value is positive 1, 2 or 3 the Markov chain 616 is shifted one to the right. If the adjustment value is negative 1, 2, or 3, the Markov chain 616 is shifted one to the left. If the adjustment value is greater than 3, the Markov chain 616 is shifted two to the right. Finally, if the adjustment value is less than negative 3, the Markov chain 616 is shifted two to the left.

The accumulated effects of multiple shifts can cause the Markov chain 616 to reach the right or left end and "roll-off". When the Markov chain rolls off, it moves the sample point used to recover the data in the data FIFO 622, thus retraining to a new determined bit eye center. As one example, the Markov chain 616 comprises a 17 element chain. In this embodiment the Markov chain 616 would be initialized with only the $9^{th}$ bit set, and it would take accumulated adjustment values of +/−9 to cause the Markov chain 616 to roll-off.

When a roll-off occurs, the Markov chain 616 is reinitialized to the center position. Additionally, since a roll-off changes the bit eye center used by the system, the shifter 604 is updated with the new expected transition values that result from the updated eye center value. It should be noted that the retraining makes the remaining data in the retrain controller 600 in error. Specifically, because the remaining data in the difference value registers 608, value selection logic 610, pair value adders 612 and Markov chain control logic 614 was generated using the previous value for the eye center, it is now off by whatever amount the eye center was adjusted. To compensate for a roll-off in the Markov chain 616 and facilitate the use of this remaining data, the Markov chain control logic 614 preferably offsets the adjustment values to compensate for the change until new, post change data arrives. Thus, if the Markov chain 616 rolls-off to the left, and thus increments the eye center, the remaining data would also be shifted left to compensate.

For example, if the Markov chain 616 rolled-off to the left the "center" adjustment value would now be a negative 2. It is negative 2 because each expected transition point has moved left one spot. Hence each "old" value would be off by negative 1, both taken together would be off by negative 2. Negative 2 would then be the new base value that should be used by the Markov chain control logic 614 to determine if, and by how much, the Markov chain 616 should be shifted. For example, an adjustment value of 0 would then be interpreted as if it where a positive 2, and the Markov chain would be shifted one to the right. The new center of the adjustment value would continue to be used until new data based on the adjusted sample point arrives at the Markov chain control logic 614. When new, post sample point adjustment data, begins to arrive the center of the adjustment value is moved back to zero.

The present invention provides a system and method for bit eye center determination. In general, the system samples an incoming data stream to determine where transitions in the data stream occur, selectively offsets the selected samples based on state criteria and the number of transitions in each set of samples, accumulates the offset samples and averages the result to determine the center of the bit eye.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An eye center trainer, the eye center trainer comprising:
a sampler, the sampler receiving a data stream and taking a plurality of samples of the data stream;
a controller, the controller receiving the plurality of samples, the plurality of samples comprising a plurality of sample sets, each sample set corresponding to samples in a bit time in the data stream, the controller locating transitions identified in the plurality of samples, selecting tap numbers corresponding to the located transitions, and offsetting the selected tap numbers based on a number of transitions in each sample set of the plurality of sample sets; and
an accumulator, the accumulator receiving the offset selected tap numbers and accumulating the offset selected tap numbers to determine an accumulated value, and wherein higher order bits in the accumulated value are used to determine which of the plurality of samples in the data stream correspond to an eye center of bits in the data stream.

2. The eye center trainer of claim 1 wherein the plurality of sample sets comprises a first sample set, a second sample set, a third sample set, and a fourth sample set, and wherein the controller offsets a first tap number in the first sample set by an offset T, and wherein the controller offsets a second tap number by an offset 0 if the second tap number is in the first sample set, and wherein the controller offsets the second tap number by the offset T if the second tap number is in the second sample set, and wherein the controller offsets the second tap number by an offset 2T if the second tap number is in the third sample set, and wherein the controller offsets a third tap number by the offset 0 if the third tap number is in the second sample set, and wherein the controller offsets the third tap number by the offset T if the third tap number is in a third sample set, and wherein the controller offsets the third tap number by the offset 2T if the third tap number is in the fourth sample set, and wherein the controller offsets a fourth tap number by the offset 0 if the fourth tap number is in the third sample set, and wherein the controller offsets the fourth tap number by the offset T if the fourth tap number is in the fourth sample set, and wherein the controller offsets the fourth tap number by the offset 2T if the fourth tap number is in a fifth sample set, and where T comprises a width of the bit time in the data stream based on a number of taps sampling each bit in the data stream.

3. The eye center trainer of claim 1 wherein the accumulator outputs the accumulated value and wherein the accumulator is seeded with an initial value selected to shift the accumulator output to identify the plurality of samples in the data stream corresponding to the eye center of bits in the data stream.

4. An eye center trainer, the eye center trainer comprising:
a sampler, the sampler receiving a data stream and taking a plurality of samples of the data stream;
a controller, the controller receiving the plurality of samples, the plurality of samples comprising a plurality of sample sets, each sample set corresponding to samples in a bit time in the data stream, the controller locating transitions identified in the plurality of samples, selecting tap numbers corresponding to the located transitions, and offsetting the selected tap numbers based on a number of transitions in each sample set of the plurality of sample sets, wherein the controller offsets tap numbers that correspond to early transitions by 0, offsets tap numbers that correspond to on time transitions by T, and offsets tap numbers that correspond to late transitions by 2T; and
an accumulator, the accumulator receiving the offset selected tap numbers and accumulating the offset selected tap numbers to determine which of the plurality of samples in the data stream correspond to an eye center of bits in the data stream.

5. The eye center trainer of claim 4 wherein T comprises width of the bit time in the data stream based on a number of taps sampling each bit in the data stream.

6. The eye center trainer of claim 4 wherein the accumulator averages the accumulated offset tap numbers to determine which of the plurality of samples in the data stream correspond to the eye center of bits in the data stream.

7. An eye center trainer, the eye center trainer comprising:
a sampler, the sampler receiving a data stream and taking a plurality of samples of the data stream;
a controller, the controller receiving the plurality of samples, the plurality of samples comprising a plurality of sample sets, each sample set corresponding to samples in a bit time in the data stream, the controller locating transitions identified in the plurality of samples, selecting tap numbers corresponding to the located transitions, and offsetting the selected tap numbers based on a number of transitions in each sample set of the plurality of sample sets, wherein the controller offsets each tap number by an offset equal to $(S-X+1)T$, where S is a sample set number for the tap number, X is a transition number for the tap number, and T comprises a width of the bit time in the data stream based on a number of taps sampling each bit in the data stream; and
an accumulator, the accumulator receiving the offset selected tap numbers and accumulating the offset selected tap numbers to determine which of the plurality of samples in the data stream correspond to an eye center of bits in the data stream.

8. The eye center trainer of claim 7 wherein the accumulator outputs an accumulated value, and wherein higher order bits in the accumulated value determine which of the plurality of samples in the data stream correspond to the eye center of bits in the data stream.

9. An eye center trainer, the eye center trainer comprising:
a sampler, the sampler receiving a data stream including a plurality of transitions, the sampler taking a plurality of samples of the data stream;
a controller, the controller receiving a plurality of sample sets from the plurality of samples, each sample set corresponding to a bit time in the data stream, the controller locating transitions identified in the plurality of sample sets, the controller selecting tap numbers corresponding to the located transitions in the plurality of sample sets, the controller determining if the located transitions is a first transition in a sample set or a second transition in a sample set, the controller offsetting the tap numbers corresponding to the located transitions based on whether the corresponding located transition is on time, early or late as determined by the located transition's sample set; and
an accumulator, the accumulator receiving the offset tap numbers and accumulating the offset tap numbers, the accumulator outputting an accumulated value, and wherein higher order bits in the accumulated value locates an eye center of bits in the data stream to determine which of the plurality of samples in the data stream are used to recover data from the data stream.

10. The eye center trainer of claim 9 wherein the plurality of samples comprises a selected subset of samples for a data stream having a first data rate, and wherein the plurality of samples comprises all samples for a data stream having a second data rate faster than the first data rate.

11. The eye center trainer of claim 9 wherein the eye center trainer further comprises a sample FIFO, the sample FIFO receiving the plurality of samples from the sampler and passing the plurality of samples to the controller.

12. The eye center trainer of claim 9 wherein the eye center trainer further comprises a data FIFO, the data FIFO receiving the plurality of samples and selecting one of the plurality of samples per bit time based on the higher order bits in the accumulated value.

13. The eye center trainer of claim 9 wherein the accumulator is seeded with an initial value selected to shift the accumulator output to the eye center of bits in the data stream and to compensate for a difference between adjacent samples in the plurality of samples.

14. The eye center trainer of claim 9 wherein the controller offsets each tap number that correspond to early transitions by 0, tap numbers that correspond to on time transitions by T, and late transitions by 2T, where T comprises a width of bit time in the data stream based on a number of taps sampling each bit in the data stream.

15. A method of locating an eye center of bits in a data stream, the method comprising:
sampling the data stream to generate a plurality of samples, the plurality of samples comprising a plurality of sample sets, each of the plurality of sample sets corresponding to a bit time in the data stream;
locating transitions identified in the plurality of sample sets;
selecting tap numbers corresponding to the located transitions;
offsetting the selected tap numbers based on a number of transitions in a corresponding sample set; and
accumulating the offset tap numbers to determine which of the plurality of samples in the data stream correspond to the eye center of the bits in the data stream by locating the eye center of bits in the data stream using higher order bits of an accumulated output.

16. The method of claim 15 wherein the plurality of sample sets comprises a first sample set, a second sample set, a third sample set, and a fourth sample set, and wherein the step of offsetting the selected tap numbers based on a number of transitions in a corresponding sample set comprises offsetting a first tap number in the first sample set by an offset T, and offsetting a second tap number by an offset 0 if the second tap number is in the first sample set, and offsetting the second tap number by the offset T if the second tap number is in the second sample set, and offsetting the second tap number by an offset 2T if the second tap number is in the third sample set, and wherein the step of offsetting the selected tap numbers based on a number of transitions in a corresponding sample set further comprises offsetting a third tap number by the offset 0 if the third tap number is in the second sample set, and offsetting the third tap number by the offset T if the third tap number is in a third sample set, and offsetting the third tap number by the offset 2T if the third tap number is in the fourth sample set, and wherein the step of offsetting the selected tap numbers based on a number of transitions in a corresponding sample set further comprises offsetting a fourth tap number by the offset 0 if the fourth tap number is in the third sample set, and offsetting the fourth tap number by the offset T if the fourth tap number is in the fourth sample set, and offsetting the fourth tap number by the offset 2T if the fourth tap number is in a fifth sample set, where T comprises a width of a bit time in the data stream based on a number of taps sampling each bit in the data stream.

17. A method of locating an eye center of bits in a data stream, the method comprising:
sampling the data stream to generate a plurality of samples, the plurality of samples comprising a plurality of sample sets, each of the plurality of sample sets corresponding to a bit time in the data stream;
locating transitions identified in the plurality of sample sets;
selecting tap numbers corresponding to the located transitions;
offsetting the selected tap numbers based on a number of transitions in a corresponding sample set, wherein offsetting the selected tap numbers based on a number of transitions in a corresponding sample set comprises offsetting each tap number that correspond to an early transition by 0, each tap number that corresponds to an on time transition by T, and each tap number that corresponds to a late transition by 2T; and
accumulating the offset tap numbers to determine which of the plurality of samples in the data stream correspond to the eye center of the bits in the data stream.

18. A method of locating an eye center of bits in a data stream, the method comprising:
sampling the data stream to generate a plurality of samples, the plurality of samples comprising a plurality of sample sets, each of the plurality of sample sets corresponding to a bit time in the data stream;
locating transitions identified in the plurality of sample sets;
selecting tap numbers corresponding to the located transitions;
offsetting the selected tap numbers based on a number of transitions in a corresponding sample set, wherein offsetting the selected tap numbers based on a number of transitions in a corresponding sample set comprises offsetting each tap number by an offset equal to $(S-X+1)T$, where S is a sample set for the tap number, X is a transition number for the tap number, and T comprises a width of a bit time in the data stream based on a number of taps sampling each bit in the data stream; and accumulating the offset tap numbers to determine which of the plurality of samples in the data stream correspond to the eye center of the bits in the data stream.

19. The method of claim 18 wherein accumulating the offset tap numbers to determine which of the plurality of samples in the data stream correspond to the eye center of bits in the data stream comprises seeding with an initial value selected to shift an output to identify the plurality of samples in the data stream corresponding to the eye center of bits in the data stream.

20. The method of claim 18 wherein accumulating the offset tap numbers to determine which of the plurality of samples in the data stream correspond to the eye center of bits in the data stream comprises locating the eye center of bits in the data stream using higher order bits of an output.

* * * * *